Oct. 9, 1934.    G. L. OLSON    1,976,411
HOT HANDLE HOLDER
Filed Nov. 21, 1933
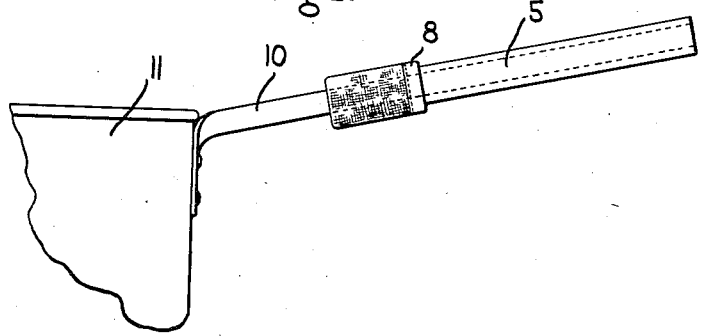
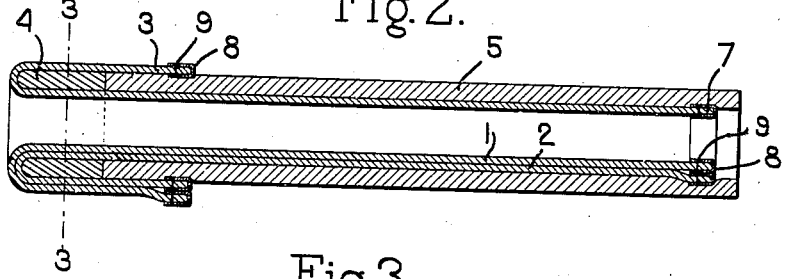
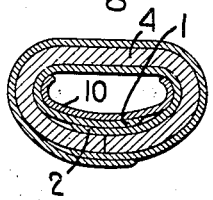
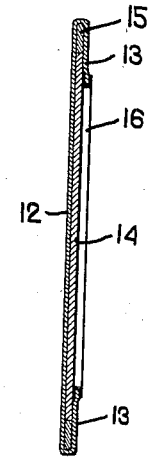
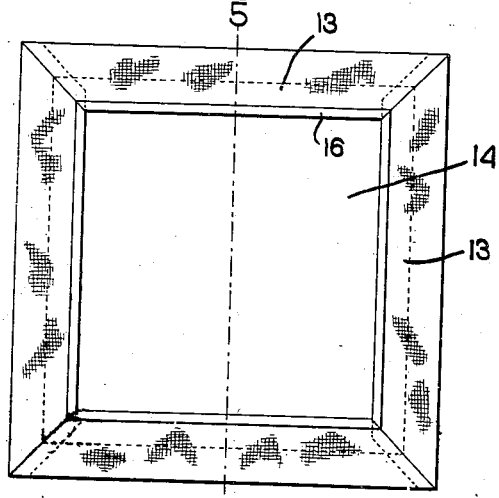
Inventor.
Gordon L. Olson
by Heard Smith & Tennant.
Attys.

Patented Oct. 9, 1934

1,976,411

UNITED STATES PATENT OFFICE 1,976,411

HOT HANDLE HOLDER

Gordon L. Olson, Arlington, Mass.

Application November 21, 1933, Serial No. 698,978

5 Claims. (Cl. 16—116)

This invention relates to a holder for use on the hot handles of cooking utensils and similar articles where it is necessary to protect the hand of the user against the heat when holding the handle and where it is important that the user shall have a firm grip upon the handle.

The object of the invention is to provide such a handle holder performing the two functions of insulating the handle against the transmission of heat to the hand of the user and of presenting a firm gripping surface to the hand of the user.

The object of the invention is further to provide such a hot handle holder in which the heat-insulating portion shall be chiefly of fabricated asbestos having high efficiency in insulating against heat and in which the gripping surface shall be of sponge rubber which not only acts to dissipate any heat transmitted to it but also affords a highly efficient gripping surface.

These and other objects and features of the invention will appear more fully from the accompanying description and drawing and will be particularly pointed out in the claims.

The invention is shown as embodied in two forms adapted for use respectively with a handle having a free projecting end and a handle of the loop form. In the former case the handle protector is preferably made of tubular form, while in the latter case it is preferably made in flat form and brought into a more or less tubular form when applied by the user of the handle.

In the drawing:

Fig. 1 is a side elevation partially broken away of a cooking utensil having a handle with a free projecting end, together with a holder embodying one form of the present invention in position thereon.

Fig. 2 is a view in longitudinal cross section of the holder shown in Fig. 1.

Fig. 3 is a view in transverse cross section taken on the line 3—3 of Fig. 2 and also a cross section of the handle.

Fig. 4 is a plan view of the second form of the holder.

Fig. 5 is a view in cross section taken on the line 5—5 of Fig. 4.

The main heat-insulating portion of the hot handle holder of this invention is a sheet of fabricated asbestos. This material is commercially available in closely woven form and that used in this invention is preferably about one-sixteenth of an inch thick.

In the construction shown in Figs. 1, 2 and 3, a rectangular sheet of this fabricated asbestos is employed and one pair of parallel edges 1 and 2 are overlapped, as shown in Figs. 2 and 3, and secured together, thus forming a tube of the required size to embrace the handle. A third edge 3 of the sheet of asbestos constituting one end of the tube is then folded back, as shown in Fig. 2.

A heat-insulating filler strip 4, preferably of asbestos, is inserted within the fold thus formed at the edge or one end of the tube and cemented in place.

A sheet of dense sponge rubber 5, preferably of about three-sixteenths to one-fourth inch in thickness, is made into a tubular form and of a length preferably to cover the asbestos tube and extend well into the fold at the end of the asbestos tube and butt against the filler strip 4, which filler strip should be of about the same thickness as the rubber sheet. Preferably the tube of rubber is formed by butting together edges of the sponge rubber sheet, cementing them with a crude rubber cement, and then vulcanizing this cement by any regular vulcanizing process as by enclosing the rubber tube in a form and heating the cemented area to a vulcanizing temperature.

The sponge rubber tube with its air spaces acts to dissipate any heat transmitted through the asbestos and gives a soft, pleasing, firm, yielding, gripping surface to the hand of the user. Moreover, the rubber tube when placed over the asbestos tube and pushed into the fold at the end of the asbestos tube, as shown in Fig. 2, remains firmly in place without the need of additional securing means.

Since the cut edges of a fabricated asbestos sheet are apt as a result of wear or usage to wear or fray away, the invention also preferably provides a binding enveloping the free edge 3 of the fold which is exposed and also preferably enveloping the free edge 7 at the end of the asbestos tube. This binding 8 may be an ordinary cotton tape or strip and may be secured in place by any suitable means such as the stitching 9.

The overlapping edges 1 and 2 of the asbestos tube may be secured together by any suitable means. A cement such as a rubber cement used in shoe manufacture has been found suitable for this purpose.

It will thus be seen that a very efficient handle protector is formed in which the end adjacent the utensil or heated portion is fully insulated by the fold at the end of the asbestos tube and the heat-insulating filler extending between the turn of the fold and the edge of the rubber tube while a highly desirable form of gripping surface is presented throughout the main portion of the tube by the sponge rubber. In Fig. 1 such a holder is shown in position on the handle 10 of a cooking utensil 11.

The same principle is employed in the construction of a holder suitable for use on a loop-shaped handle such as the bail of a cooking utensil or the handle of a flatiron. In this case the holder is left in a flat form, as shown in Figs. 4 and 5, and may be of any desired configuration. As shown, it is of rectangular or square shape. In this case the sheet 12 of fabricated asbestos has all of its edges 13 folded back and retained in position as by being cemented together at the overlapping portions shown at the corners in Fig. 4. A sheet 14 of sponge rubber is superimposed on the asbestos sheet and extends within the fold at all of the edges. Between the edge of the sponge rubber sheet and the turn of the fold of the asbestos sheet there is likewise inserted the filler strip 15 of heat-insulating material. The free edge of the asbestos sheet is also preferably provided with the binding 16. All of these elements are made and secured together substantially as already described, but without bringing the protector into the tubular form.

It will thus be seen that in both forms of the invention described, the hot handle holder is composed of a sheet of fabricated asbestos having at least one folded edge and a sheet of sponge rubber superimposed on the asbestos sheet and extending within the fold of this edge, and that a heat-insulating filler is interposed within the fold of the asbestos sheet between the edge of the rubber sheet and the turn of the fold, and that means are provided for retaining the folded edge in folded position, and that further in the preferred form a binding envelops the free edge of the fold and is secured to the asbestos sheet.

Having thus described the invention, what is claimed as new, and desired to be secured by Letters Patent, is:

1. A heat-insulating hot handle holder comprising a sheet of fabricated asbestos having a folded edge, a sheet of sponge rubber presenting a soft and yielding but firm gripping surface to the hand, acting by its air spaces to dissipate heat, superposed on the asbestos sheet and extending within the fold of the said edge, the said asbestos sheet acting to protect the sponge rubber from injury by the hot handle and to insulate with high efficiency the sponge rubber against transmission of heat thereto, a heat-insulating filler within the said fold between the edge of the rubber sheet and the turn of the fold acting further to protect and insulate against heat the said edge of the rubber sheet, and means for retaining the said folded edge in folded position.

2. A heat-insulating hot handle holder comprising the construction defined in claim 1, together with a binding enveloping the free edge of the fold and secured to the asbestos sheet.

3. A heat-insulating tubular hot handle holder comprising a rectangular sheet of fabricated asbestos having one pair of parallel edges overlapped and secured together and a third edge folded, thus presenting a tube with a fold at one end, a sheet of sponge rubber in tubular form fitting over the asbestos tube with one end extending within the said fold and presenting a soft and yielding but firm gripping surface to the hand and acting by its air spaces to dissipate heat while the said asbestos sheet acts to protect the tube of sponge rubber from injury by the hot handle and to insulate it with high efficiency against transmission of heat from the hot handle thereto, and a heat-insulating filler within the said fold between the end edge of the rubber tube and the turn of the fold and acting further to protect and insulate against heat the edge of the tube.

4. A heat-insulating hot handle holder having the construction defined in claim 3, together with a binding enveloping the free edge of the fold and secured thereto.

5. A heat-insulating tubular hot handle holder comprising a tubular sheet of fabricated asbestos having the edge at one end folded, a tubular sheet of sponge rubber fitting over the asbestos tube with one end extending within the said fold and presenting a soft and yielding but firm gripping surface to the hand and acting by its air spaces to dissipate heat while the said asbestos sheet acts to protect the tube of sponge rubber from injury by the hot handle and to insulate it with high efficiency against transmission of heat from the hot handle thereto, and a heat-insulating filler within the said fold between the end edge of the rubber tube and the turn of the fold and acting further to protect and insulate against heat the edge of the tube.

GORDON L. OLSON.